JEREMIAH SCHROY, OF FORTVILLE, INDIANA.

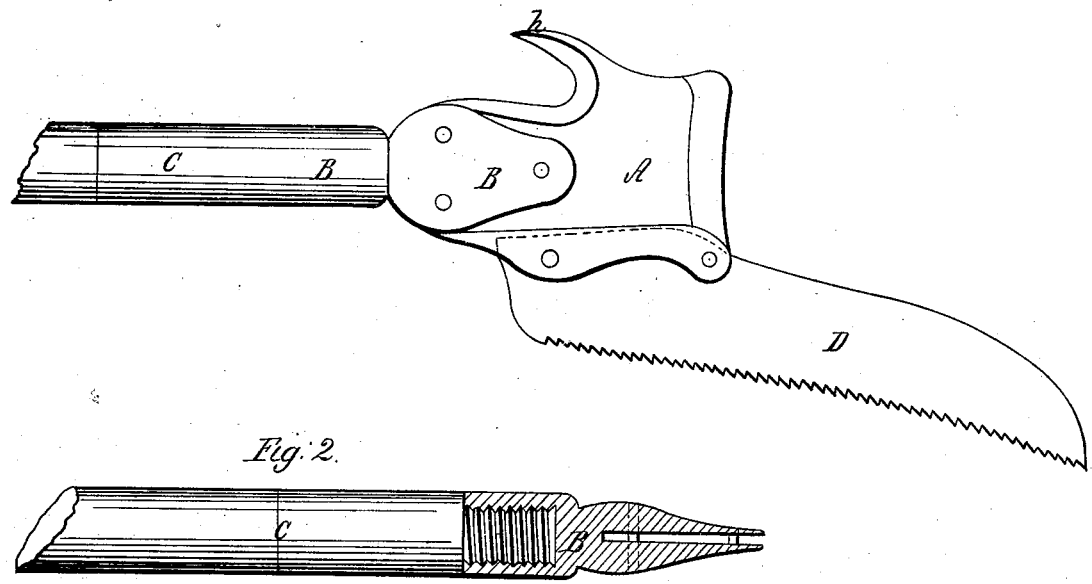

Letters Patent No. 85,861, dated January 12, 1869; antedated January 2, 1869.

IMPROVEMENT IN PRUNING-INSTRUMENT.

The Schedule referred to in these Letters Patent and making part of the same.

*To all whom it may concern:*

Be it known that I, JEREMIAH SCHROY, of Fortville, in the county of Hancock, and in the State of Indiana, have invented certain new and useful Improvements in Combined Pruning-Saw, Hook, and Chisel; and do hereby declare that the following is a full, clear, and exact description thereof, reference being had to the accompanying drawings, and the letters of reference marked thereon.

In the annexed drawings, making a part of this specification, A represents a chisel, provided with a hook, $h$, and made in the form shown.

The chisel and hook may be made of any suitable metal, cast or wrought, as may be desired, and one side of the chisel provided with a groove, in which the saw D is secured.

B represents a suitable shank or fastening for the plate or chisel A. Said shank B is made with one end split or bifurcated, as shown, between the sides of which the plate A is riveted, and with a hole in the other end, provided with a screw-thread, in which fits the end of the adjustable handle C.

The parts A and B may be made of one piece of metal, or cast in one piece, if desired.

The handle C is provided with a metallic ferrule, which has screw-threads around its end, to fit and work in the hollow of the shank B.

A handle, of any required length, may thus be adjusted to the shank B, and thereby to the chisel, hook, and saw.

D represents a small saw, fastened to the part A, or in the groove thereof, by means of screws or rivets.

It will be seen that the above-described device makes a very convenient and useful implement for pruning trees of any kind.

The saw D is secured in the groove on the under side of the chisel, with its back extending beyond the edge of said chisel, so that, when the chisel is used in making a thrust-cut, the back of the saw, resting on the top of the branch to be removed, acts as a guide to the chisel.

Should the saw or the combined hook and chisel become broken in use, they can be extracted separately from the shank, and a new portion substituted therefor.

I do not broadly claim a combined saw and chisel.

What I claim, is—

The pruning-instrument, consisting of the hook and chisel $h$ A, and saw D, with the shank B, when the saw is arranged in a groove in the chisel, and its back extends along and beyond the edge of said chisel, all constructed substantially as specified.

In testimony that I claim the foregoing, I have hereunto set my hand, this    day of          , 1868.

JEREMIAH SCHROY.

Witnesses:
 JOHN G. STUART,
 JAS. BILLS.